United States Patent [19]
Mayberry

[11] 3,870,949
[45] Mar. 11, 1975

[54] METHOD AND APPARATUS FOR TESTING THE PULSE PERMEABILITY OF LAMINAE OF CORE LAMINATIONS

[76] Inventor: Leonard A. Mayberry, 710 Paul St., Escondido, Calif. 92027

[22] Filed: Apr. 19, 1974

[21] Appl. No.: 462,337

[52] U.S. Cl. ............................................ 324/34 PE
[51] Int. Cl. .......................................... G01v 33/12
[58] Field of Search .......... 324/34 R, 34 P, 34 MC, 324/13, 14

[56] References Cited
UNITED STATES PATENTS
| | | | |
|---|---|---|---|
| 2,550,951 | 5/1951 | Young | 324/34 R |
| 3,337,797 | 8/1967 | Maytay | 324/14 |
| 3,488,577 | 1/1970 | Gross | 324/13 |

*Primary Examiner*—Robert J. Corcoran
*Attorney, Agent, or Firm*—Brown & Martin

[57] ABSTRACT

Testing apparatus having a test transformer with a single primary loop positioned in one plane and a single secondary loop in a second plane with the planes having a 90° orientation eliminating the coefficient of coupling, and positioning a core lamina through the primary and secondary loops and through the intersection of the planes, and supplying a series of constant high-power, square wave pulses having a rapid rise time to the primary winding and detecting the peak amplitude output of the secondary winding to determine the pulse permeability of the core lamina being tested.

14 Claims, 11 Drawing Figures

PATENTED MAR 11 1975
3,870,949
SHEET 1 OF 2
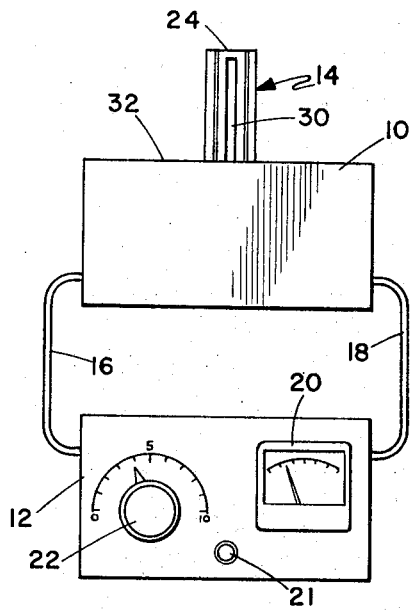
Fig. 1
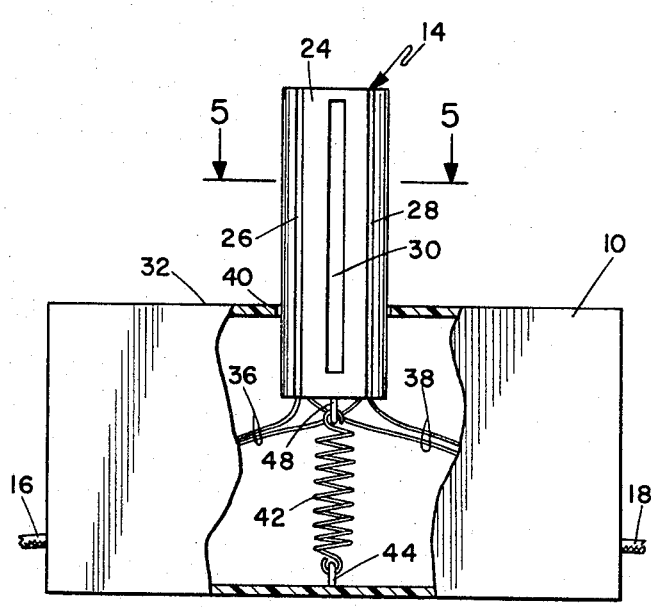
Fig. 2
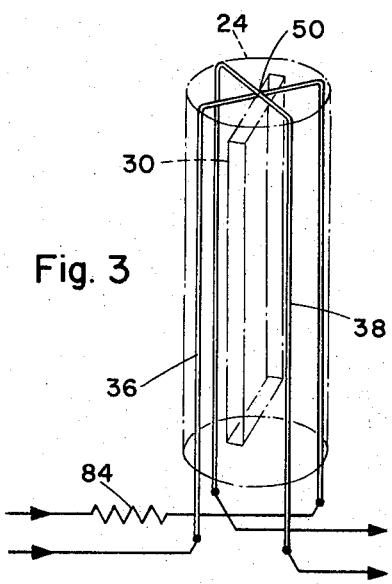
Fig. 3
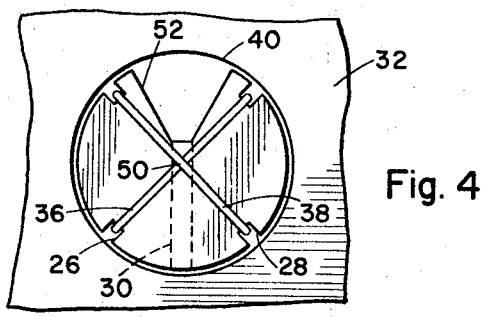
Fig. 4
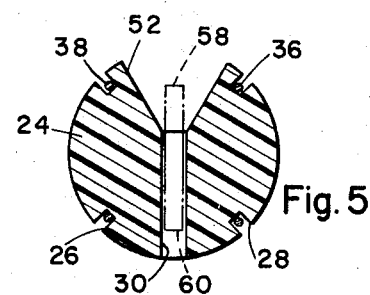
Fig. 5
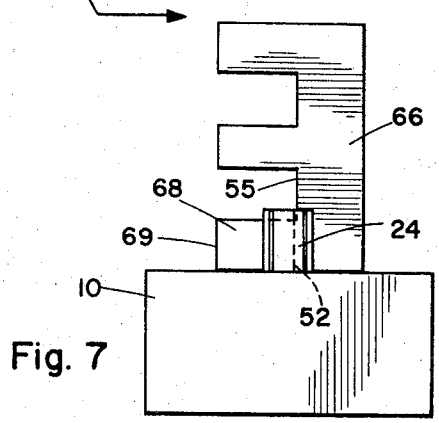
Fig. 7
Fig. 6

METHOD AND APPARATUS FOR TESTING THE PULSE PERMEABILITY OF LAMINAE OF CORE LAMINATIONS

BACKGROUND OF THE INVENTION

In making laminated cores for use in transformers and the like, a plurality of core laminae are assembled. Often the permeability and specifically the pulse permeability of the laminae vary. Thus the predictability of the ultimate pulse permeability of the core is uncertain. Yet it is desirable, if not essential, to know the pulse permeability of an assembled core. The procedure now normally used by most transformer manufacturing companies is to wind a transformer coil and stack in the core laminae, and then subject the completed transformer to series of engineering tests. If the permeability is above or below that of the required specification, then a few of the laminae are replaced with laminae either having a higher or a lower permeability. The transformer is then again tested and the process repeated as necessary to achieve the permeability desired.

This procedure requires about 1 to 3 hours minimum time depending upon the type of core and the complexity of the test winding. As a result, a large amount of time and expense is involved in testing core materials and most manufacturers thus accept core materials without verification. This too often causes an entire production run of transformers to be defective or at least inferior in quality. The foregoing is compounded by more and more core suppliers having an increasing tendency to use inferior and unknown quality materials and production practices because of economic pressures of higher costs.

Thus it is desirable to have a new and improved method and apparatus for testing core laminations so that cores made from such tested laminations will have a predictable pulse permeability.

SUMMARY OF THE INVENTION

In a preferred embodiment of the method and apparatus of this invention, a test transformer is used having a primary winding comprising a single loop and a secondary winding comprising a single loop. Each of these windings are in planes, having a 90 degree orientation. The windings are mounted on an elongated holder body of non-magnetic material. The holder body has a longitudinal slot through which a core lamina is inserted, with the portion of the core lamina in the slot being positioned at the intersecting line of the winding loop planes. The windings, being in the 90° orientation, have a coefficient of coupling that is substantially zero. Thus in the absence of the core lamination, the output across the secondary is zero.

The test body is mounted through an opening in a work platform supported on a housing and is resiliently biased in a housing so that the core lamina, when positioned in the slot, is pulled into contact with the working surface, and against the end of the slot. Thus the core lamina does not have to be held by the operator during testing.

A pulse generator supplies a spaced series of relatively high-power, square wave pulses of electrical current. The pulses have a very rapid rise time with constant power characteristics and are supplied to the primary winding to induce magnetic flux in the core lamina by being excited by the single turn primary. The output signal, appearing across the one turn secondary, represents the pulse permeability of the core material. The output signal across the secondary is amplified and integrated to a series of ramp voltages. These ramp voltages are fed to a peak detector that detects the peak voltages, which voltages are displayed on a meter that reads out the pulse permeability of the particular core lamina being tested. The peak detector has a slow amplitude decay that provides a relatively stable meter reading between the pulses.

The high power used and the rapid rise time, provide an output that is well above any thermal noise and that can be readily amplified and integrated to produce a reliable reading at the detector and meter.

Only a portion of the core lamina is tested, which is indicative of the permeability of the entire lamination. The slot in the holder body can accept different size laminae, although the body has a sufficiently small cross section that the reluctance of the system is reduced to a minimum. So the slot is only large enough to normally accept a single lamina. To avoid end spraying of magnetic flux and thus give unreliable pulse permeability readings, it is necessary that the particular portion of the core lamina tested be positioned along the intersecting line of the windings and spaced a sufficient distance from the ends of the test lamina to avoid end spraying. The diameter of the holder body is sufficiently small, that all of the larger size laminae may be inserted through the slot and the intersection of the coils be spaced a sufficient distance from the ends of the lamina. However, to accept smaller laminae the holder body has a longitudinal groove with divergent sides that allows the body of the lamina to pass into the groove with the lamina leg extending through the slot a sufficient distance to provide the required lamina end spacing to avoid end spraying.

In using the apparatus for testing the permeability of core laminae, the structure and operation particularly lend to quick, easy and accurate testing of pulse permeability of large numbers of core laminae by relatively unskilled operators.

It is therefore an object of this invention to provide a new and improved method and apparatus for economical testing and inspecting of transformer core materials to determine pulse permeability of core laminae in a quick and rapid process that does not require skilled personnel.

Other objects and many advantages of this invention will become more apparent upon a reading of the following detailed description and an examination of the drawings, wherein like reference numerals designate like parts throughout and in which, FIG. 1 is a side view of an embodiment of the test apparatus of this invention.

FIG. 2 is an enlarged side elevation view, with parts broken away, of the test fixture portion of the test apparatus.

FIG. 3 is a schematic illustration of the single loop primary and secondary windings.

FIG. 4 is an enlarged top end view of the holder body and windings of FIGS. 1 and 2.

FIG. 5 is an enlarged sectional view taken along line 5—5 of FIG. 2.

FIG. 6 is a top end view of a modified embodiment of the holder body of FIG. 2.

FIG. 7 is a side view of an E shaped core lamina mounted in the holder body and held in test position.

Figure 8:
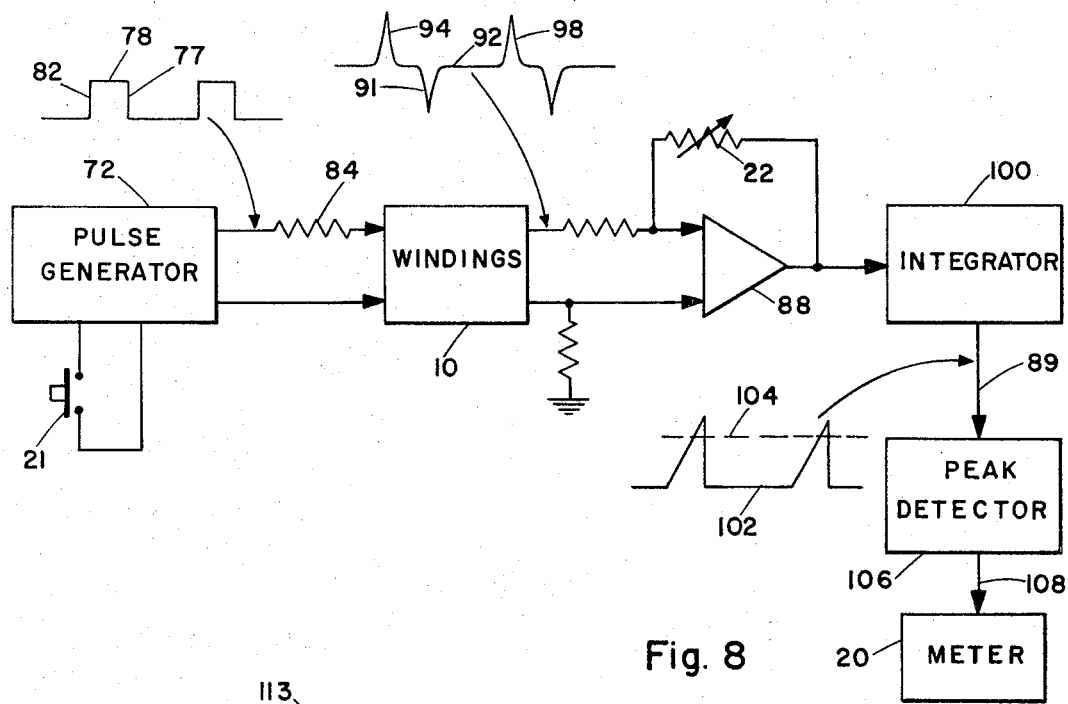
FIG. 8 is a block and schematic diagram of the electrical test circuit.

Referring now to the drawings, apparatus for testing the pulse permeability of a core lamina, FIGS. 1 and 2 show a housing 10 that supports a test transformer and holder body 14 through opening 40. The windings of the test transformer are connected through cables 16 and 18 to an instrumentation housing and panel 12 that may be spaced a convenient distance from the test station 10.

Referring to FIGS. 2 and 3, the test transformer comprises a one turn loop of conducting wire 36 that is the primary and a one turn loop of conducting wire 38 that is the secondary or output side of the test transformer. Each of the windings is in a given plane and the planes are in a normal or 90° orientation that reduces the output across the secondary, absent a lamina being positioned in the transformer loops, by reducing the coefficient of coupling to zero. As schematically illustrated in FIG. 3, a portion of a core lamina is positioned in a slot 30 so that it is positioned through both winding loops in an equidistant 45° position from each of the windings and passes through the intersecting line of the respective winding planes.

The test transformer windings 36 and 38 are mounted on a holder body 24. The holder body 24 may be made of a suitable insulating and non-magnetic material such as plastic, bakelite and 28, the like. The holder body 24 has a cylindrical elongated shape with four longitudinal grooves, such as grooves 26 and 28, that are on 90° spacings. The primary and secondary winding loops pass through the grooves and over the end of the holder 24 across at 50. The windings have normal enamel insulation. The holder has a longitudinal slot 30 that extends from one end to the other but is closed at each end providing a unitary enclosing structure. The slot is oriented to pass directly through the holder in a plane that is spaced equidistant from each of the slots 26 and 28 and thus from the windings 36 and 38.

The holder body 24 slidably moves through opening 40 in the work table 32 portion of the housing 10. A spring 42 is attached at one end 48 to the holder 24 and at the other end 44 to the base of the housing or container 10 and resiliently biases the holder 24 downwardly into the container 10. The windings 36 and 38 are connected through suitable cable members 16 and 18 to the driving circuits, as will be described hereinafter.

Figure 11:
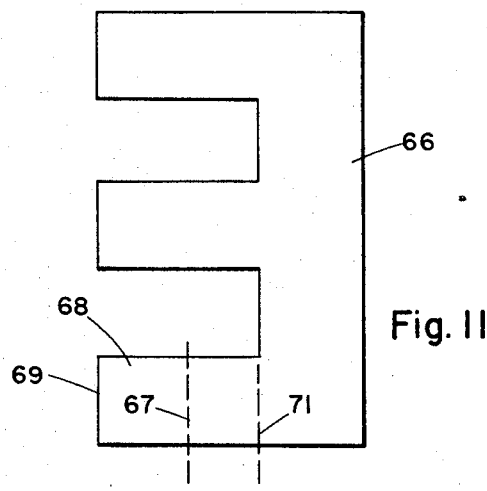
FIG. 11 is a side view of an E-shaped core lamina with the test portion location illustrated.

In mounting a core lamina in slot 30 for testing, the lamina usually takes the form of an E-shaped lamina 66, see FIGS. 7 and 11. In testing the permeability of the core material of the core lamina, a portion of the lamina such as the lower leg 68 of core 66 is passed through the slot 30. To accomplish this, the holder 24 is pulled upwardly and the leg 68 is inserted into the slot. The holder is then released with the spring 42 pulling the holder downwardly so that the upper closed end of the slot 30 bears against the upper edge of the leg 68, holding the lamina 66 against the working table 32. Thus the test may be operated without the operator having to hold the core lamina 66.

Figure 10:
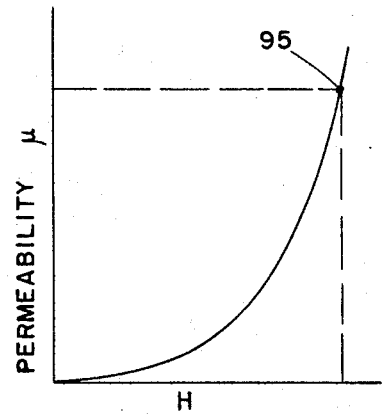
FIG. 10 is a diagram of the test parameters.

In testing the transformer core laminae, the test comprises inducing a flux into a core lamina as evidenced by the secondary voltage in the secondary winding, to measure the ability of the core material to magnetize rapidly. This is known as determining the pulse permeability of the core material. Stated another way, the test is to determine how quickly the molecules in the core material will twist around and line up in the magnetic field. In this test, a series of constant, high-power, input pulses 78 are impressed across the primary winding with each pulse having almost an instantaneous rise time 82. Each of these pulses induces a magnetic flux that is proportional to the permeability of the core lamination. Thus in the formula $B = \mu H$, $B$ is the flux density in the core, $\mu$ is the permeability, and $H$ is the flux density in the air when no core is present. $H$ is a constant determined by the electrical driving force and the coil configuration. Since $H$ is held a constant, $\mu$ is established by determining $B$. Normally $\mu$ follows the graph as illustrated in FIG. 10, with the point 95, for example, being the desired pulse permeability to be established.

For best accuracy of a measurement of the permeability of the core lamina being tested, it is necessary that the flux density H be confined to a relatively small portion of the total volume of space occupied by the lamina. When this condition is obtained, most of the flux density H contributes to the desired flux density B. Thus as illustrated in FIGS. 4 and 11, it is necessary that the test intersection 50 be at least between the dotted lines 67 and 71. If the test intersection is too close to the end 69 of leg 68, a portion of H will not contribute to B due to end spraying of flux. Further it is necessary that the windings 36 and 38 have as few turns as possible, and enclose as closely as possible the end 68 of the core lamina 66, to further reduce loss of flux due to spraying of flux outside the particular unit volume of core material being tested.

Referring to FIGS. 2, 4, 5, and 7, in testing a lamina such as lamina 66, that is large, the intersection line 50 of the respective primary and secondary winding loops is sufficiently spaced from the end 69 of leg 68. Thus in testing such laminae, the holder 24 may be cylindrical and have the configuration as illustrated in FIG. 6. However, to test relatively small in size laminae, when the end 68 is inserted through the slot 30 the edge 55 abuts against the side of the holder 24 and a test is then required to be made relatively close to the end 69 of the leg 68. So the holder in the preferred embodiment illustrated in FIGS. 4 and 5, has a groove 52 extending the longitudinal length thereof. The groove 52 has diverging sides that terminate at substantially the intersecting line 50 of the windings 36 and 38. Thus a small lamina, such as lamina 58 having a short leg 60, see FIG. 5, may be positioned in the groove 52 and a pulse permeability test made with the center of the flux path 50 being at a point sufficiently spaced from the end 69 to reduce the effect of end spray on the magnetic test circuit.

In providing the large power pulses to the test windings, a known pulse generator 72 is operated by a push button control 21 that is mounted on the face panel 12. Closing switch 21 causes the pulse generator to generate the pulse wave form 78. This wave form 78 has a pulse rise time 82 that is extremely fast and has a flat-top, square wave. The pulses are spaced any desired amount, as will meet the requirements of the circuit and yet provide a stabilized reading on the meter, as will be described in more detail hereinafter. A current limiter 84 functions to supply a constant current to the primary winding loop 36. The signal induced in the secondary winding loop 38, that results from the generation of magnetic flux in the circuit, is a pulse 94 that has a rapid increase and then a decline as the power pulse remains static during the flat portion of the pulse. The decline 77 of the input pulse results in a reverse voltage being induced into the secondary winding as shown by the wave form 91. Space 92 between pulses 94 and 98 results from the spacing between the respective pulses in wave form 78.

The secondary pulse wave form is then fed through an operational amplifier 88 to an integrator 100. Integrator 100 is arranged to respond only to the positive pulses 94 and 98 and provides ramp voltages in ramp voltage wave form 102 for each positive pulse. A peak detector 106 detects the peaks of the integrator voltages. The peak detector then provides an output to the meter that is reflected in a meter reading 20 on the face of the equipment 12. The magnitude of the peak voltage 104 is displayed on the meter. Since the flux density can vary considerably in the circuit with different core laminae, the feedback loop of the operational amplifier 88 is provided with a variable resistance 22 that can take the form of a decade, step-range, setting device that is set and correlated to provide within range, meter readings.

Figure 9:
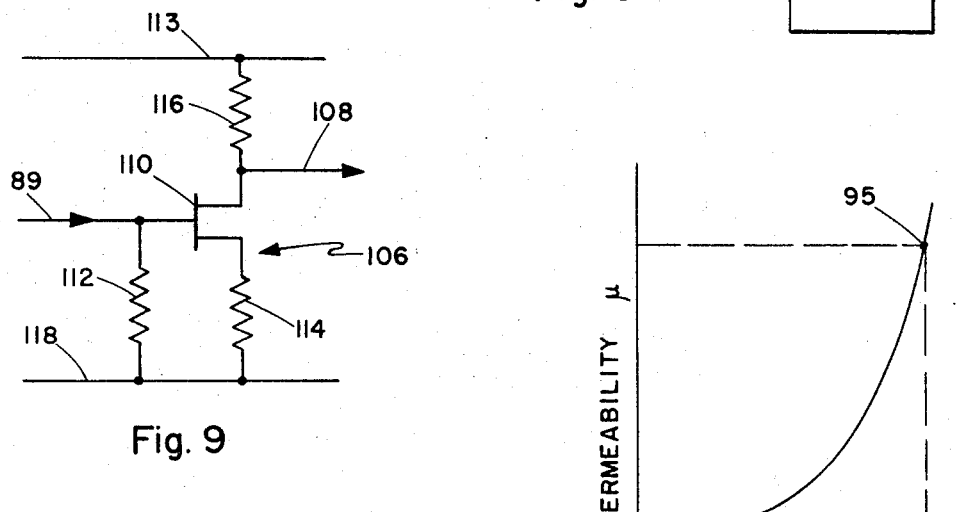
FIG. 9 is a schematic diagram of the peak detector circuit.

In operation of the circuit, the degree of magnetic flux that can be induced in a single core lamina by a single turn primary is necessarily small. However, the primary is driven by a spaced series of relatively high power pulses of electrical current. An example is 2 amperes at 50 volts fed to the primary loop through a 25 ohm current limiting resistor 84. It is necessary that the pulse have a very rapid rise time. An example is $10^{-6}$ seconds. This induces sufficient power, even in the smallest lamina to be tested, that the random or thermal noise level is exceeded by the output test voltage. For example, experimental results of tests on a core lamina measuring 0.125 inch wide by 0.5 inch long by 0.006 inch thick showed a test signal output of 6 millivolts across the terminals of the secondary winding 38. This is well above any masking thermal noise and can be readily amplified and integrated to produce a reliable reading at the detector and output meter portion of the test unit. The width between the pulses can be as desired. The peak detector circuit, illustrated in FIG. 9, feeds the ramp voltages through line 89 to a Field Effect Transistor 110. Resistors 116 and 114 form the circuit of the FET switch across input and ground lines 113 and 118. Resistor 112 has a relatively large resistance in the order of, for example, 10 megohms and thus presents a high input impedance to the relatively low output impedance of the integrator. This sets the peak voltage at which the peak detector 106 is responsive, and also provides a slow decay curcuit that evens out the output to the meter 20. An example of pulse width and spacing is a 5 microsecond pulse having a spacing in the order of 500 Hz.

In operation, an operator pulls the holder body 14 upward and inserts the end of a lamina into slot 30. Push button 21 is pushed and held a sufficient time to provide a reading on the meter 20. If the reading on meter 20 is off scale, then the decade adjuster 22 is adjusted to provide the desired reading for a given type of lamination, that has an engineering specification requirement of permeability. Thus the meter is capable of reading the permeability of a specimen that meets specification and will give readings that will indicate when a given specimen does not meet specification.

Having described my invention, I now claim:

1. Apparatus for testing the pulse permeability of core laminae comprising,
   a transformer having a first winding in a first plane and a second winding in a second plane with said planes and winding loops having a 90° orientation to one another,
   means for positioning a portion of core laminae in the loops of both of said windings,
   means for providing a plurality of electrical pulses to said primary winding,
   and means responsive to output pulses in said secondary winding in response to said pulses provided to said primary winding for determining the pulse permeability of said core laminae.

2. Apparatus as claimed in claim 1 wherein,
   said primary winding comprises a one turn loop and said secondary winding comprises a one turn loop.

3. Apparatus as claimed in claim 2 wherein,
   said loops are only slightly larger than that portion of core lamina inserted therethrough.

4. Apparatus as claimed in claim 3 wherein,
   said positioning means including a holder that holds the core lamina at 45° angles to said first plane and second plane and across the intersection of said first and second planes.

5. Apparatus as claimed in claim 2 wherein,
   said positioning means comprising an elongated holder body of non-magnetic material,
   each of said primary and secondary windings being held in elongated loops on said holder body,
   and said holder body having a longitudinal slot for receiving said portion of said core lamina for testing.

6. Apparatus as claimed in claim 5 wherein,
   said winding planes intersecting at a longitudinal intersecting line,
   and said longitudinal slot being positioned to hold said core lamina through said intersecting line.

7. Apparatus as claimed in claim 6 wherein,
   said holder body having a longitudinal groove with outwardly diverging sides that intersect with said slot in alignment therewith at substantially the location of said longitudinal line.

8. Apparatus as claimed in claim 6 including,
   a housing having an upper surface with an opening,
   said holder body projecting an outer end through said opening in said surface,
   and resilient means for pulling said body downwardly through said opening and pulling a core lamina positioned in said slot to a held position between said upper surface and the outer end of said holder body.

9. Apparatus as claimed in claim 2 wherein,
   said pulse means including means for generating a series of high power pulses with each having a square wave shape with a very rapid rise time.

10. Apparatus as claimed in claim 9 including,
    current limiting means for providing constant current to said primary winding.

11. Apparatus as claimed in claim 10 wherein, the electrical power of said pulse being in the order of 2 amperes and 50 volts with a rise time in the order of $10^{-6}$ seconds.

12. Apparatus as claimed in claim 10 including,
   amplifier means for amplifying the output of said secondary winding,
   integrator means for integrating said amplified output,
   peak detector means for detecting peak amplitudes of the output of said integrator means,
   and meter means for displaying the output of said peak detector means.

13. Apparatus as claimed in claim 12 wherein,
   said peak detector means having a slow decay time, providing a continuous output reading to said meter means between said pulses.

14. The method of testing the pulse permeability of core lamina comprising the steps of,
   orienting a first loop of primary winding of a test transformer with a 90° intersection with a second turn of a secondary winding of the test transformer,
   positioning a core lamina across the intersection of the windings and through the loops of the winding,
   providing a constant high power square wave pulse having a rapid rise time to the primary winding,
   and detecting the generated peak voltage in the secondary winding to provide the pulse permeability of the core lamina.

* * * * *